(12) United States Patent
Chien et al.

(10) Patent No.: US 8,303,346 B2
(45) Date of Patent: Nov. 6, 2012

(54) ELECTRICAL CONNECTOR ASSEMBLY WITH SUPPORT FOR AN OPTOELECTRONIC MODULE

(75) Inventors: Cheng-Ching Chien, Tu-Cheng (TW); Yao-Chi Huang, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 271 days.

(21) Appl. No.: 12/778,153

(22) Filed: May 12, 2010

(65) Prior Publication Data
US 2010/0291777 A1 Nov. 18, 2010

(30) Foreign Application Priority Data
May 12, 2009 (TW) .................................. 98115609

(51) Int. Cl.
*H01R 24/00* (2011.01)
(52) U.S. Cl. ...................................... 439/630
(58) Field of Classification Search .................. 439/630, 439/159, 326, 38, 305
See application file for complete search history.

(56) References Cited

U.S. PATENT DOCUMENTS

| 7,682,172 | B2* | 3/2010 | Lu .................................. 439/181 |
| 7,878,857 | B2* | 2/2011 | Chien ............................ 439/630 |
| 7,967,608 | B2* | 6/2011 | Chien ............................ 439/38 |
| 2009/0035964 | A1* | 2/2009 | Yamamoto et al. ............. 439/79 |
| 2009/0142946 | A1* | 6/2009 | Lu .................................. 439/95 |
| 2010/0290742 | A1* | 11/2010 | Chien ............................ 385/75 |
| 2010/0297858 | A1* | 11/2010 | Chien ............................ 439/65 |

* cited by examiner

*Primary Examiner* — Chandrika Prasad
(74) *Attorney, Agent, or Firm* — Wei Te Chung; Ming Chieh Chang

(57) ABSTRACT

An electrical connector assembly mounted on a printed circuit board (PCB) includes an insulating housing. The insulating housing includes a base with opposite front and rear end regions and a plurality of side walls upwardly extending from the base. The base cooperates with the side walls to commonly define a first receiving room. A notch defined in the front region of the base forms a second receiving room under the first receiving room. Said second receiving room is smaller than the first receiving room in both the front-to-back direction and a transverse direction perpendicular to said front-to-back direction. No portions of said contacts are located in the second receiving room so as to allow an optoelectronic module including a first portion and a second portion to be snugly received in the first receiving room and the second receiving room respectively, the second portion is attached to the first portion and supported on a top surface of the PCB.

12 Claims, 5 Drawing Sheets

ELECTRICAL CONNECTOR ASSEMBLY WITH SUPPORT FOR AN OPTOELECTRONIC MODULE

BACKGROUND OF THE INVENTION

1. Field of the Invention

The present invention relates to an electrical connector for receiving card-like components or similar module therein.

2. Description of the Related Art

Conventionally, electrical connectors are widely used in electronic devices to establish electrical connection between two electrical elements. As shown in FIG. 5, an electrical connector is soldered on a circuit board 1' by surface mounting technology (SMT). The connector includes an insulative housing 2' and a cover 3' pivotally mounted to one side of the housing. The insulating housing 2' comprises at least one row of terminal receiving passageways, a first receiving room and a second receiving room. A first electronic module 4' is received in the first receiving room, and a second electronic module 5' is received in the second receiving room. The second electronic module 5' is attached to the first electronic module 4' and spaced a distance from the circuit board 1'. Therefore the second electronic module 5' exerts a tremendous and unwanted force on the first electronic module so that the first electronic module 4' is subject to damage.

In view of the above, a new electrical connector that overcomes the above-mentioned disadvantages is desired.

SUMMARY OF THE INVENTION

Accordingly, an object of the present invention is to provide a compact electrical connector assembly which is not subject to damage.

To fulfill the above-mentioned object, an electrical connector assembly mounted on a printed circuit board (PCB) comprises an insulating housing. The insulating housing comprises a base with opposite front and rear end regions along a front-to-back direction and a plurality of side walls upwardly extending from the base. The base cooperates with the side walls to commonly define a first receiving room. A notch defined in the front region of the base forms a second receiving room under the first receiving room. Said second receiving room is smaller than the first receiving room in both the front-to-back direction and a transverse direction perpendicular to said front-to-back direction. No portions of said contacts are located in the second receiving room so as to allow an optoelectronic module including a first portion and a second portion to be snugly received in the first receiving room and the second receiving room respectively, the second portion is attached to the first portion and supported on a top surface of the PCB.

Other objects, advantages and novel features of the invention will become more apparent from the following detailed description when taken in conjunction with the accompanying drawings.

DETAILED DESCRIPTION OF THE PREFERRED EMBODIMENT OF THE INVENTION

Figure 1:
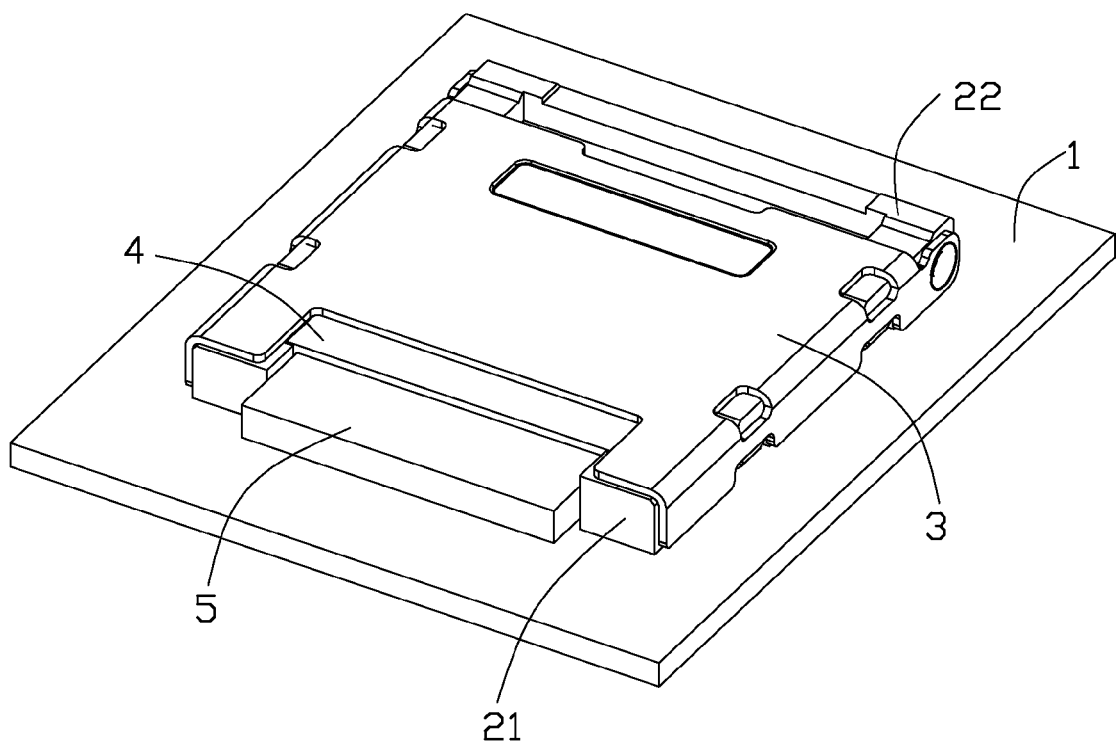
FIG. 1 is a perspective view of an electrical connector assembly in accordance with a preferred embodiment of the present invention.

Reference will now be made to the drawings to describe the present invention in detail.

Referring to FIGS. 1-4, an electrical connector assembly mounted on a printed circuit board (PCB) 1 in accordance with the present invention, comprises an insulating housing 2, a plurality of terminals 6 secured in the housing 2, an optoelectronic module and a cover 3 loaded on the housing 2.

The insulating housing 1 comprises a base 20 with opposite front and rear end regions along a front-to-back direction, and with a plurality of side walls upwardly extending therefrom. The base 20 cooperates with the side walls to commonly define a first receiving room 200. A notch defined in the front region of the base 20 forms a second receiving room 6 under the first receiving room 200.

The sidewalls includes a first sidewall 21, a second sidewall 22 opposite to the first sidewall 21, a third sidewall 23 connecting with one ends of the first and second sidewalls 21, 22, and a fourth sidewall 24 opposite to the third sidewall 23 and connecting with another ends of the first and second sidewalls. The four sidewalls have a common planar top surface 211 which is higher than the plane top surface 201 of the base 20 and therefore the first receiving room 200 is defined among the top surface 201 of the base and inside surfaces 212 of the sidewalls.

The second receiving room 6 under the first receiving room 200 defines a first inner surface 61, a second inner surface 62 which is parallel and opposite to the first inner surface 61 and a third inner surface 63 connecting the first inner surface 61 with the second inner surface 62. The distance between the third inner surface 63 and the second sidewall 22 is smaller than that between the third inner surface 63 and the first sidewall 21. A plurality of passageways penetrates through the base 20 and is located between the third inner surface 63 and the second sidewall 22.

Said second receiving room 6 is smaller than the first receiving room 200 in both the front-to-back direction and a transverse direction perpendicular to said front-to-back direction. The reminder of first sidewall 21 is defined as two stopping walls 210. The second receiving room 6 occupies more than one half of the whole base 20.

An optoelectronic module which has a first portion 4 and a second portion 5 is received respectively in the first receiving room 200 and the second receiving room 6, the second portion 5 is attached to the first portion 4 and supported on a top surface of the PCB 1, thereby making full usage of the electrical connector assembly and preventing the first portion 4 and housing 1 from damage.

The cover 3 shields both the base 20 and the side walls thereon and further the optoelectronic module. The cover 3 is pivotally mounted to the rear region of the base 20 and moveable between opened and closed positions. The cover 3 is designed and configured to retain the optoelectronic module when the cover 3 is closed and locked to the base in a vertical direction perpendicular to both said front-to-back direction and said transverse direction when said cover 3 is located in the closed position. The cover 3 does not hold the optoelectronic module during assembling the optoelectronic module to the housing 1 when said cover 3 is located in the opened position so that the optoelectronic module can be independently assembled to the housing 1 with assistance of said cover 3.

Figure 2:
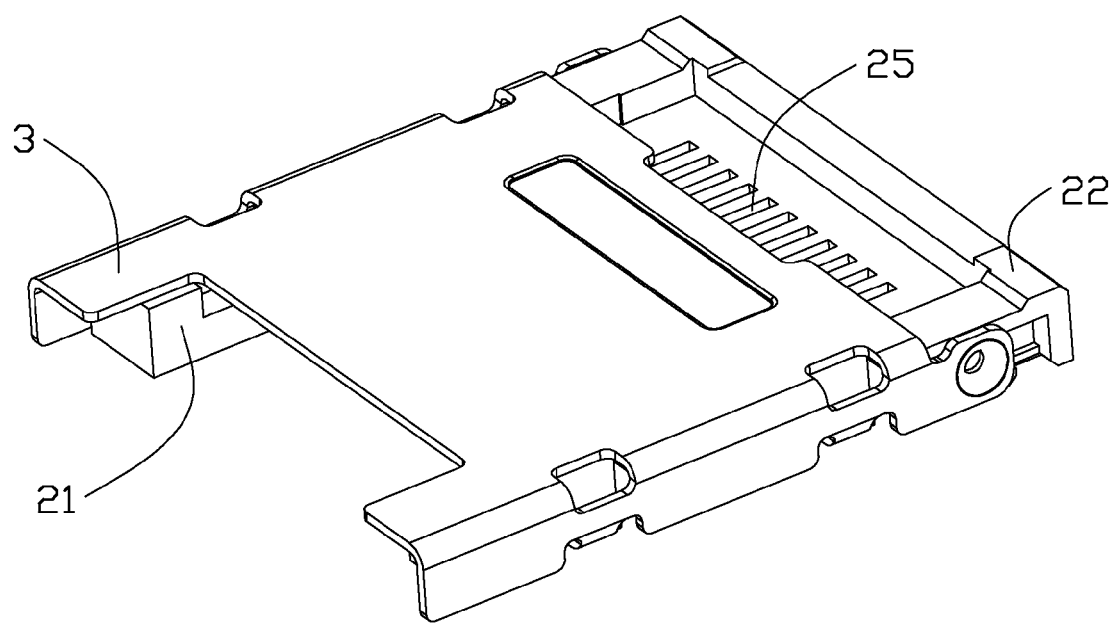
FIG. 2 is an isometric view of the electrical connector, with a cover being in a closed position.
Figure 3:
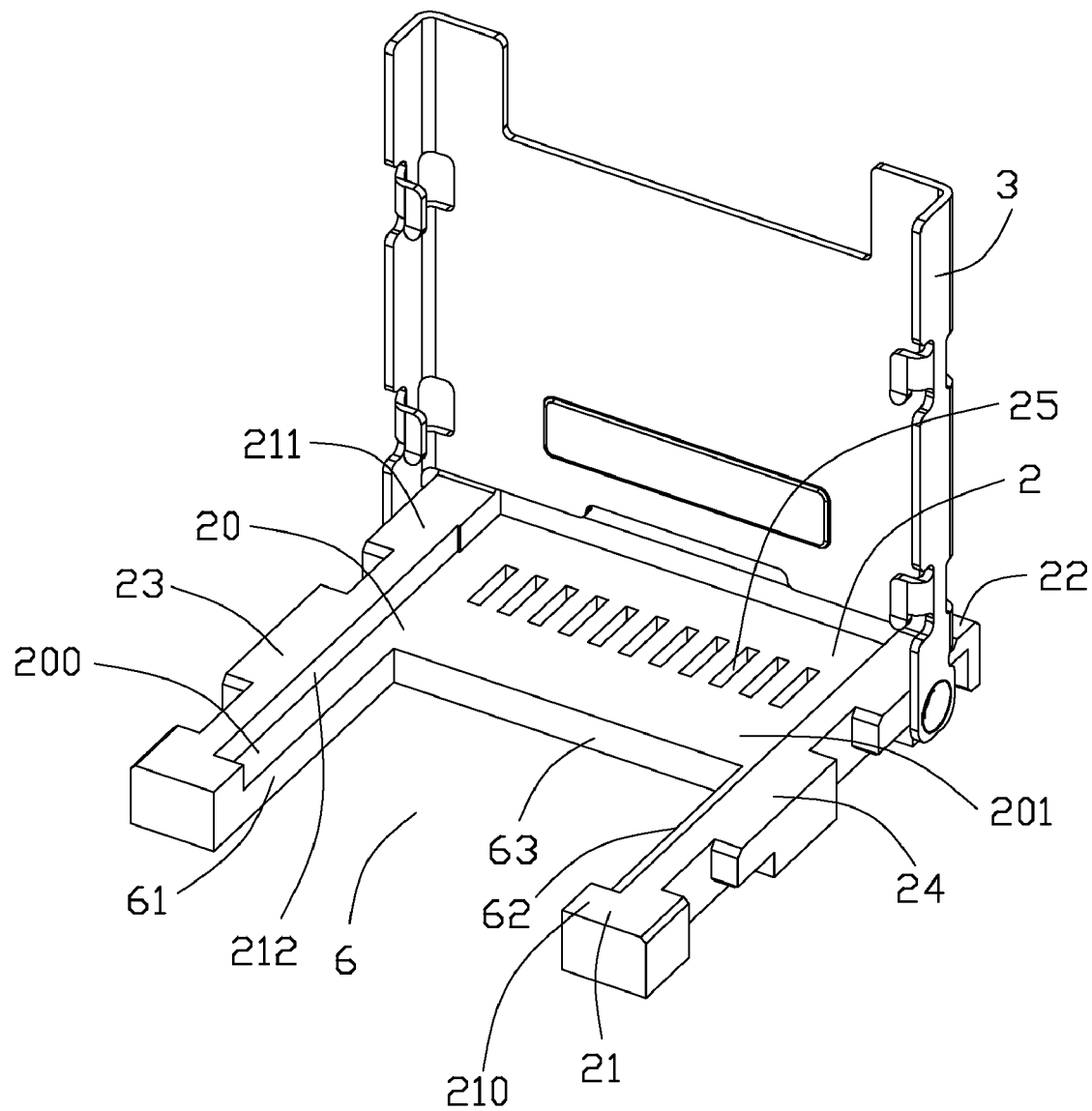
FIG. 3 is an isometric view of the electrical connector, with a cover being in an open position.
Figure 4:
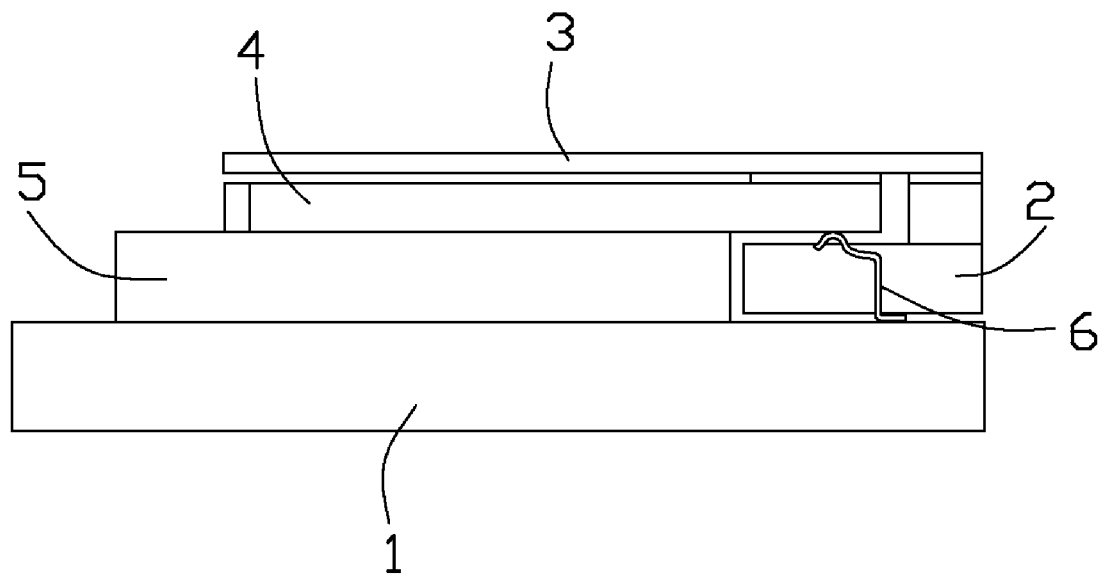
FIG. 4 is a schematic view of the electrical connector assembly.
Figure 5:
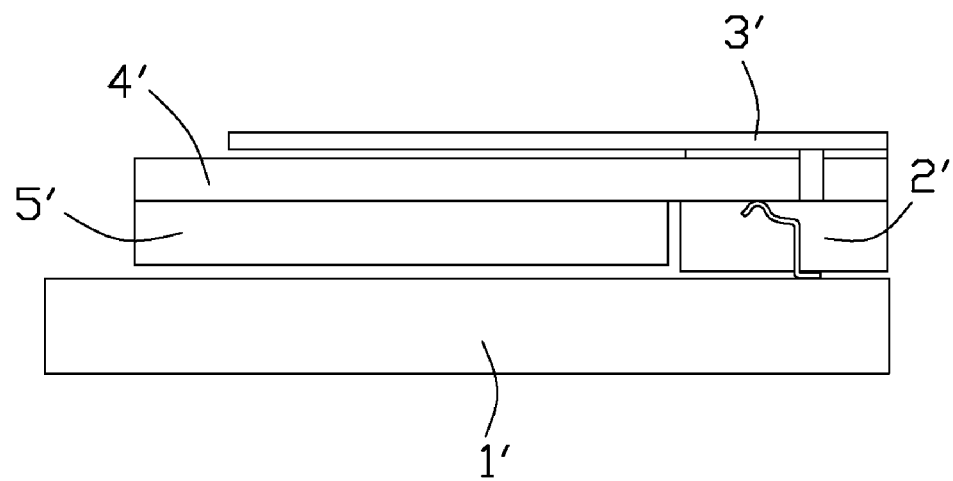
FIG. 5 is a schematic view of a conventional electrical connector assembly.

As best shown in FIG. 2, the first portion 4 of the optoelectronic module is pushed into the first receiving room 200, supported by the base 20 and four sidewalls, particularly the stopping walls 210 prevent the first portion 4 from escaping from the first receiving room 200. The second portion 5 below the first portion 4 is received in the second receiving room 6 and supported on the PCB 1.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An electrical connector assembly mounted on a printed circuit board (PCB), comprising:
   an insulative housing loaded with a plurality of contacts and defining a base with opposite front and rear end regions along a front-to-back direction and a plurality of side walls upwardly extending from the base;
   the base cooperating with the sidewalls to commonly define a first receiving room; and
   a notch defined in the front region of the base to form a second receiving room under the first receiving room, said second receiving room being smaller than the first receiving room in both the front-to-back direction and a transverse direction perpendicular to said front-to-back direction; wherein
   no portions of contacts are located in the second receiving room so as to allow an optoelectronic module including a first portion and a second portion to be snugly received in the first receiving room and the second receiving room respectively, the second portion is attached to the first portion and supported on a top surface of the PCB.

2. The electrical connector assembly as claimed in claim 1, wherein a cover is pivotally mounted to the rear region of the base and moveable between open and closed positions.

3. The electrical connector assembly as claimed in claim 2, wherein said second receiving room is smaller than the first receiving room in both the front-to-back direction and a transverse direction perpendicular to said front-to-back direction.

4. The electrical connector assembly as claimed in claim 3, wherein the sidewalls includes a first sidewall, a second sidewall opposite to the first sidewall, a third sidewall connecting with one ends of the first and second sidewalls and a fourth sidewall opposite to the third sidewall and connecting with another ends of the first and second sidewalls, the four sidewalls have a common plane top surface which is higher than the plane top surface of the base.

5. An electrical connector assembly comprising:
   a printed circuit board defining an upper surface;
   an insulative housing seated upon the upper surface, said housing defining a U-shaped structure in a top view, and upper and lower receiving rooms in a vertical direction, said upper receiving room being located on an upward mating face of the housing;
   a plurality of contacts disposed in the housing with contacting sections extending upwardly beyond the upward mating face and into the upper receiving room; and
   an optoelectronic module having stacked upper portion and lower portion, said upper portion received in the upper receiving room and said lower portion received in the lower receiving room; wherein
   the lower portion is intimately seated upon the upper surface while the upper portion is slightly spaced from the upward mating face and engages the contacting sections of the contacts in the vertical direction.

6. The electrical connector assembly as claimed in claim 5, wherein a metallic shell is pivotally assembled to the housing, and restrains the optoelectronic module from upward movement.

7. The electrical connector assembly as claimed in claim 5, wherein the housing includes two opposite side arms located by two sides of both said upper receiving room and said lower receiving room, and each of said side arms defines a step for restraining backward movement of the optoelectronic module.

8. The electrical connector assembly as claimed in claim 7, wherein the lower portion extends forwardly beyond distal ends of said two sides arms.

9. An electrical connector assembly comprising:
   an insulative housing defining a U-shaped structure in a top view, and upper and lower receiving rooms in a vertical direction, said upper receiving room being located on an upward mating face of the housing;
   a plurality of contacts disposed in the housing with contacting sections extending upwardly beyond the upward mating face and into the upper receiving room; and
   an optoelectronic module having stacked upper portion and lower portion, said upper portion received in the upper receiving room and said lower portion received in the lower receiving room; wherein
   a bottom face of the lower portion is lower than that of the housing, while the upper portion is slightly spaced from the upward mating face and engages the contacting sections of the contacts in the vertical direction.

10. The electrical connector assembly as claimed in claim 9, wherein a metallic shell is pivotally assembled to the housing, and restrains the optoelectronic module from upward movement.

11. The electrical connector assembly as claimed in claim 9, wherein the housing includes two opposite side arms by located two sides of both said upper receiving room and said lower receiving room, and each of said side arms defines a step for restraining backward movement of the optoelectronic module.

12. The electrical connector assembly as claimed in claim 11, wherein the lower portion extends forwardly beyond distal ends of said two sides arms.

* * * * *